United States Patent [19]

Vogel et al.

[11] 4,298,554
[45] Nov. 3, 1981

[54] COHERENT RIGID SOLID MATERIAL

[75] Inventors: Edward G. Vogel, Lebanon; Rodney C. Westlund, Lansdale, both of Pa.

[73] Assignee: Lebanon Steel Foundry, Lebanon, Pa.

[21] Appl. No.: 921,595

[22] Filed: Jul. 3, 1978

Related U.S. Application Data

[60] Division of Ser. No. 851,407, Nov. 14, 1977, Pat. No. 4,138,268, which is a continuation-in-part of Ser. No. 782,950, Mar. 30, 1977, abandoned.

[51] Int. Cl.³ .............................................. C04B 35/16
[52] U.S. Cl. ........................................ 264/25; 106/38.3; 106/38.9; 106/84; 106/DIG. 2; 252/62; 264/56; 264/63; 264/71; 264/82; 264/121; 264/122; 260/292 N; 260/37 N; 428/109; 428/255
[58] Field of Search .................... 264/63, 56, 71, 25, 264/121, 122, 82; 252/62; 106/38.3, 38.9, 84, DIG. 2; 428/109, 255; 260/37 N

[56] References Cited

U.S. PATENT DOCUMENTS

| | | | |
|---|---|---|---|
| 2,921,357 | 1/1960 | Fujii | 264/63 |
| 3,264,380 | 8/1966 | Parsons | 264/56 |
| 3,371,135 | 2/1968 | Goodwin | 264/63 |
| 3,658,564 | 4/1972 | Gerow et al. | 252/62 |
| 3,718,491 | 2/1973 | Yates | 106/84 |

Primary Examiner—James H. Derrington
Attorney, Agent, or Firm—Woodcock, Washburn, Kurtz, Mackiewicz & Norris

[57] ABSTRACT

An especially high strength, high temperature, economical material useful for insulation is preferably made by making up a mix having the following proportions in parts by weight: 20–50 parts expanded perlite; 0.5–4 parts sodium fluosilicate; 0.2–5 parts fiber material; a water solution having 9.5–19 parts total of solids content of sodium or potassium silicate; 2–9 parts zinc oxide; and water which, along with the water in the sodium silicate solution totals 21.5–67 parts; thereafter storing the mix under cover for less than 2½ hours, compressing or blowing the mix to a desired form, and curing and drying it by heating.

26 Claims, 5 Drawing Figures

COHERENT RIGID SOLID MATERIAL

RELATED APPLICATION

This is a division, of application Ser. No. 851,407, filed Nov. 14, 1977, now U.S. Pat. No. 4,138,268 which is a continuation-in-part of application Ser. No. 782,950, filed Mar. 30, 1977 now abandoned.

BACKGROUND OF THE INVENTION

This invention relates to a method of making a new coherent rigid solid material particularly adapted for use as an insulating material.

Heat insulating materials are known which are prepared from fillers having at least a 75% reactive expanded perlite content and alkaline ionic silicates. Such materials are formed and cured so as to enable the perlite fraction of the filler to react with the silicate to produce a crystalline reaction product. U.S. Pat. No. 3,658,564 discloses such a material and a method of making such a material.

The material of U.S. Pat. No. 3,658,564 is made by using an extended curing period of at least three days and preferably seven to achieve relative water insensitivity. Moreover, curing is accomplished under carefully controlled conditions of humidity and temperature during this period. The required curing creates some difficulties in the large scale production of the high temperature insulating material.

In addition, the material of U.S. Pat. No. 3,658,564 must be made with specific $SiO_2:K_2O$ and $SiO_2:Na_2O$ ratios in the alkaline ionic silicates. In particular, water resistive or insensitive products require $SiO_2:Na_2O$ ratios of 3:1 to 4:1 and $SiO_2:K_2O$ of 2:1 to 2.6:1 to achieve a water insensitive product. Furthermore, the material of U.S. Pat. No. 3,658,564 has a rough surface texture which is undesirable from a cosmetic standpoint. The roughness is also undesirable because of the inability to provide intricate shapes, e.g., miter joints.

SUMMARY OF THE INVENTION

It is a purpose of the invention to provide a method of making a material which is especially useful as heat insulating material.

A further purpose is to provide a method of making such a material which is at once practical and reasonably economical and has especially good strength, low bulk density, low thermal conductivity, and good dimensional stability.

It is also a purpose to provide a method of making a material which has a relatively smooth and cosmetically pleasing texture.

A further purpose is to provide a method of making such a material which has expanded perlite as a major constituent.

A further purpose is to provide a method of making such a material which has relatively good water resistivity, that is, ability to maintain shape and weight and reasonable strength in the face of exposure to water, and even better resistivity as to oil, has a corrosion inhibition property in the presence of such things as chlorides and chlorine, and resistivity to surface burning.

A further purpose is to provide a method of making such a material which can be made by a practical, economical and effective process.

In accordance with these and other purposes of the invention, the process of making a coherent rigid solid material comprises the steps of first mixing the following parts by weight: expanded perlite 20 through 50 parts; sodium silicate or potassium silicate including 9.5 through 19 parts solids content of sodium silicate itself; zinc oxide 2 through 9 parts, and water to make a total of water including any that may be associated with the sodium or potassium silicate at 21.5 through 67 parts. Thereafter, the mixture is subjected to heat as a result of which there is no longer the original content of water.

In a preferred embodiment, the material may be compressed or blown into shape between mixing and subjecting to heat. Compressing may, for example, be done under vibration with compression being performed in one or a plurality of steps in which only part of the material is compressed at one time.

The materials may be mixed by bringing together expanded perlite as a dry material with a slurry including sodium silicate, zinc oxide and water and mixing until the mixture appears damp and dust free but short of the time when the mixture begins to substantially shrink. After mixing, the mixture may be held in storage for one hour through 2½ and then compressed or blown into shape before subjecting to heat.

In the preferred embodiments of the invention, the mixture may be subjected to heat in a hot air oven in a range from 93° C. to 99° C. with 96° C. preferred. In the alternative, the mixture may be subjected to heat by a microwave heating means.

In a preferred embodiment, an organic or inorganic fiber material may also be mixed with the materials. Preferably, the fiber material is from a class comprising 1 through 5 parts fiberglass, 0.2 through 1.5 parts heat resistant nylon, 1 through 5 parts mineral wool, and 1 through 5 parts of netting, all by weight as part of the mixture.

In particularly preferred embodiments of the invention, the mixture includes expanded perlite 29 through 45 parts; sodium silicate 11.5 through 18 parts; zinc oxide 3 through 8 parts; and water, to make a total of water including any that may be associated with the sodium silicate, of 26.5 through 57 parts. In a yet more preferred embodiment of the invention, the mixture comprises expanded perlite 36 through 42 parts; sodium silicate 14.5 through 16.5 parts; zinc oxide 4.5 through 6.8 parts; and water, to make a total of water including any that may be associated with the sodium silicate of 32.5 through 43.5 parts.

Sodium fluosilicate may be utilized as a solidifying agent in the mixture so as to include 1 through 6 parts by weight. In the alternative, carbon dioxide may be utilized as the solidifying agent.

In a preferred method, the material is formed by compressing or blowing the material into separable segments comprising mating tongues and grooves.

DETAILED DESCRIPTION OF PREFERRED EMBODIMENTS

Figure 1:
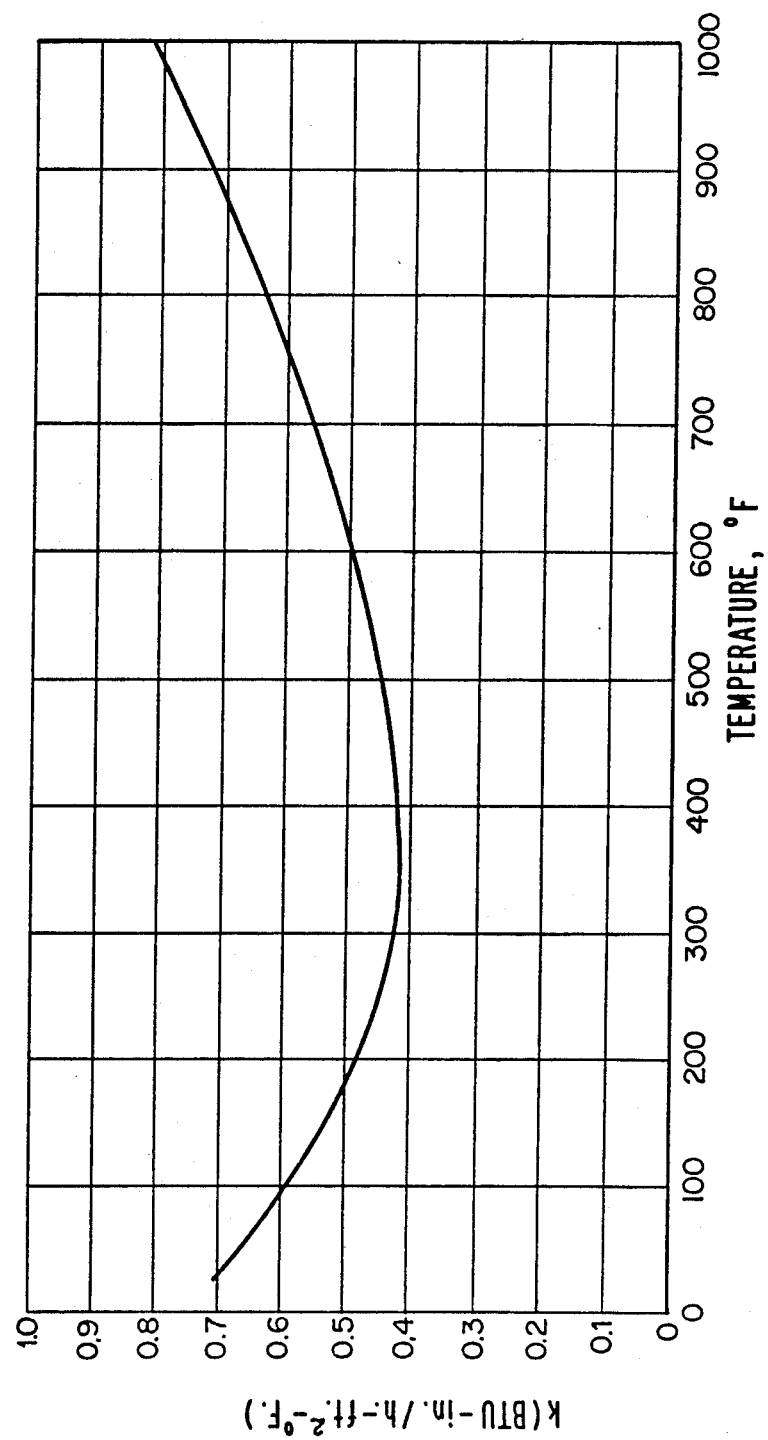
FIG. 1 is a diagram illustrating the thermal conductivity of the material of the invention.

The material of the present invention starts out ultimately on a basis of approximately 100 parts by weight as a mix of the following:

expanded perlite 20 through 50 parts, preferably 29 through 45 parts, with 36 through 42 representing an optimum;

sodium fluosilicate 0.5 through 4 parts, preferably 1 through 3.5 parts, with 2 through 3 preferred;

fiber material 0.2 through 5 parts, preferably 1 through 5 parts;

sodium silicate or potassium silicate including 9.5 through 19 parts, preferably 11.5 through 18 parts, solids content of sodium silicate itself, with 14.5 through 16.5 representing the optimum;

zinc oxide 2 through 9 parts, preferably 3 through 8 parts, with 4.5 through 6.8 representing the optimum;

water, to make a total of water, including any that may be associated with the sodium silicate, of 21.5 through 67 parts, preferably 26.5 through 57, with 32.5 through 43.5 representing the optimum.

It is brought to this state by mixing the expanded perlite, the sodium fluosilicate and the fiber material together in powder form and separately mixing the sodium silicate in a solution of preferably 36 through 44% solids, with 38% preferred or potassium silicate in a solution of preferably 24 to 35%, zinc oxide and water together to form a slurry which is in turn mixed in with the powder. The mixing is then continued up at least to the time the mix appears damp and dust-free, but not up to the time the mix starts to shrink substantially.

Various mixing devices, such as a planetary batch mixer, or a continuous screw feed mixer, are suitable for the mixing, a pug mill batch mixer also being suitable.

The material may be passed through a screen, which will preferably have half inch openings, after the mixing.

The material is then preferably held in storage under cover up to two and one half hours. This step has been observed to have the effect of markedly increasing the strength of the final product.

The material is then compressed, by a ram or vibration, into the shape in which it will ultimately be wanted. Another less preferred way of bringing it into shape is to put part of it into a mold or the like that may be used and compress that part and then put in part or all of the additional and compress it, and so on.

The material is then heated to cure it, this being preferably done in a microwave oven. If in a conventional oven utilizing hot air then it should preferably be done in the temperature range from 93° C. through 99° C. and preferably from approximately two through approximately four hours per inch of the smallest dimension or maximum thickness of the shape, and most preferably at 96° C. for four hours for each inch of the smallest dimension or maximum thickness of the shape.

The fiber material may comprise a class of organic or inorganic materials including 1 through 5 parts fiberglass or a heat resistant nylon-type fibrous material, such as poly (1, 3-phenylene isophthalamide), sold commercially under the tradename Nomex, can be used less preferably instead of the fiberglass, in which case the amount will be 0.2 through 1.5 parts by weight and preferably 0.5 parts by weight. Another less preferable possibility for this is mineral wool, such as rockwool in the amount of 1 through 5 parts or preferably 1 part. Cotton or wood fibers may also be used.

The fiberglass or other fibrous material is in the form of a floc—that is, a set of fibers in short lengths, averaging preferably ⅛ through ¼ inch long and most preferably in fibers averaging ¼ inch long.

The class of fiber material also includes 1 through 5 parts of netting which may be organic or inorganic materials including polypropylene, polyester, nylon or Dacron. The netting comprises fibers of a thickness in the range of 0.007 to 0.125 inches, openings having areas in the range of 0.06 to 1 square inch and weight of less than 2 lbs. per thousand square feet. The netting strength should exceed 4 grams per denier when subjected to an Instron tester at 65% relative humidity. The openings in the netting may take on a variety of shapes including squares, rectangles, circles or ovals.

All fiber materials must be stable at temperatures in excess of 250° F., i.e., there is no substantial softening below these temperatures.

The expanded perlite should have a dry bulk density of 2 through 8 lbs. per cubic foot, and preferably 2 through 3½ lbs. per cubic foot. The perlite is a complex sodium potassium aluminum silicate volcanic granular glass. Its screen sizing should be AFS (American Foundry Society) average screen size designation of 70 through 120 and preferably 110. A perlite with 25% maximum contaminants including no more than 0.5% each of Fe of Ca and no more than 0.1% of each of arsenic, barium, beryllium, boron, chlorine, chromium, copper, gallium, lead, manganese, molybdenum, nickel, sulphur, titanium, yttrium and zirconium is suitable. Expanded perlite includes all perlite made from naturally occurring perlite sand which is expanded by heat. The fusion temperature is in excess of 2300° F. and has a solubility of less than 1% in water, less than 10% in 1NONaOH and less than 3% in mineral acids.

The sodium silicate should become part of the mix in the form of a water solution capable of being handled in a practical manner. Any commercially available solution will suffice but it is preferred that its ratio of silicon dioxide to sodium oxide should preferably be in the range of 3.1 to 1 through 3.4 to 1, and most preferably 3.22 to 1, and it should have a solids content preferably in the range of 36 through 44%, and most preferably 38%. An example of a suitable sodium silicate grade to use is the N grade of Philadelphia Quartz. Where potassium silicate is used, the ratio of silicon dioxide to potassium oxide should preferably be in the range of 2.0 to 1 through 2.7 to 1 with a solids content of 24 to 35%.

For good results, it is important that the zinc oxide should be finely divided and fairly clean, e.g., the type that is produced by the so-called French process. Use of the zinc oxide in finely divided form has been found to quite substantially increase the strength and the water resistivity. A zinc oxide having an average fineness of no more than 0.50 microns is suitable, 0.10 to 0.20 being preferred; 98 to 99% purity or more particularly reagent grade is suitable from the standpoint of purity.

Instead of including the sodium fluosilicate as a solidifying agent to add green strength, a less preferred alternative which nevertheless has special advantages is to pass carbon dioxide gas under pressure into or through the materials after it has been compressed into shape.

The curing or drying step, can well take place in an oven, for example in an electric or other conventional oven with air circulating around within it, and in such a case the piece of material being subjected to the heating should be so supported that the maximum area of the piece will have direct access to the air in the oven. For example, a piece with relatively longer and shorter dimensions should be supported with its longest dimension in the vertical direction, which will achieve this result and also tend to prevent warping. Dehydrating and otherwise curing the material can also be accomplished by the use of microwave energy in heating devices such as ovens, which have a capability of securing the result in a much shorter time, for example for some time such as 5 minutes to the inch of minimum dimension or maximum thickness. Use of this has been found on the average to enhance the strength more than 20% as compared to using a conventional oven.

To further illustrate the invention, the following examples are illustrative of suitably carrying out of the invention.

EXAMPLE 1

This example involves the making of a block 12 inches by 8 inches by 2 inches, for the purpose of which 200 cubic inches of material is made in order to have enough to make the block together with a small excess to accommodate handling losses.

The following materials are secured:

| | | | |
|---|---|---|---|
| 1. | PFF 10 perlite (powder) | 352 g | (29%) |
| 2. | Sodium fluosilicate (powder) | 24 g | (2%) |
| 3. | Fiberglass (¼" fibers) | 12 g | (1%) |
| 4. | Water | 290 g | (24%) |
| 5. | Sodium silicate (3:22:1) (liquid) | 473 g | (39%) |
| 6. | Zinc oxide (powder, rubber pigment type) | 61 g | (5%) |
| | | 1212 g | (100%) |

Items 1, 2 and 3 are added to a ten gallon bowl capacity Hobart mixer. Items 4, 5 and 6 are pre-mixed in a slurry. The mixer is turned on and the slurry is poured into bowl in a way that the stream will meet the path of the impeller. It is important in this particular case that the mixing does not exceed 35 seconds nor be less than 20 seconds.

The material may be passed through a ½ inch opening screen. The material is then held in storage 90 minutes under cover. At this time, the material is added to the mold box. About one third is added and spread evenly across the bottom of the box. This is gently and carefully rammed, after which the remaining portion is added. The box which is designed to receive about 2.3 pounds of the damp mix is then positioned under a hydraulic press head. A close-fitting, smooth, wooden block is then inserted into the loaded mold box.

This block being high enough will act as a piston and will drive the mixture downward, compressing it into the proper sized block.

The mold box is so constructed that it is more than deep enough to receive the batch as given and rammed according to the instructions given above.

The box surfaces should have three coats of pattern lacquer, rubbed smooth, and paste wax applied giving it a final shiny, good-releasing surface.

The box is constructed in a way that the corners can be loosened after block forming, thus, allowing easy, scuff-free removal of the molded piece. At this point, the driving piston block can be used to eject the formed piece, for its subsequent transfer to a dryer plate.

The oven drying then takes place as follows:

Measuring the total thickness at 2 inches, eight hours at 96° C. eliminates sufficient free water and apparently properly accomplishes the formation of willemite which is believed to be important for securing the best results with such a block. This involves four hours of such heat for each inch of minimum dimension, or maximum thickness in an ordinary air heat oven.

At this time, if the particular material in question was being produced for commercial use, the block could be stored, packed or shipped.

Where sodium fluosilicate is used, it should be of pharmaceutical grade finely powdered with an analysis purity of in excess of 23% $Na_2SiF_6$ and a fineness of 95% through a 200 mesh screen. Where carbon dioxide gas is used, it should be at more than 99% purity, and can be applied under 15 lbs. gauge pressure for four to five seconds per inch of thickness of matrix, i.e., inside dimension to outside dimension.

Where sodium fluosilicate is used, it should be of pharmaceutical grade finely powdered. Where carbon dioxide gas is used, it should be at more than 99% purity, and can be applied under 15 lbs. gauge pressure for four seconds per inch of thickness of matrix.

In the forming step, a compressive action by the moving head of 30 to 100 lbs. per square inch is suitable and of course the mold should have a strength to withstand this. The compacting step with vibration should take no longer than ten seconds per cubic foot of material. Vibration can suitably be at a rate of 300 or 1000 pulses per minute, for example.

The material can instead be formed by blowing it into a suitable cavity, in a mold to make a pre-shaped piece, in the manner of core blowing in foundry practice. Suitably screened vents permit the escape of the air which is carrying the material, while keeping the material in the cavity, in a shape formed under pressure of the blowing.

In the mold used in the forming step, a coating of Teflon or epoxy with high gloss can take the place of the pattern lacquer used in the example.

So likewise the box construction with provision for loosening the corners found in the example can be made unnecessary by securing a good straight travel in ejection.

EXAMPLE 2

The following mixture is prepared:

| | | |
|---|---|---|
| 1. | PFF 10 perlite (powder) | 164 g (39.00%) |
| 2. | Sodium fluosilicate (powder) | 10 g (2.40%) |
| 3. | Water | 45 g (10.70%) |
| 4. | Zinc oxide | 27 g (6.50%) |
| 5. | Sodium silicate solution | 174 g (41.40%) |

Items 1 and 2 are dry mixed in a Hobart mixer for 10 seconds at which time the slurry made by separately mixing 3, 4 and 5 is added to the running mixer and such mixing is continued until the mixture appears dust free but short of a time when it starts to shrink in volume.

After 30 minute storage under a plastic sheet cover, a 50 gram portion is lightly tamped into a special Dietert transverse metal mold box with split corners. A drop weight rammer is actuated 8 to 12 times making an exact 1×1×8 inch bar of compressed material whose density will be 13.5 to 14.0 lbs. per cubic foot after the bar has been dried by microwave energy for 4 to 6 minutes.

EXAMPLE 3

The sodium fluosilicate of Example 2 is eliminated and the procedure to make and test bars as set forth in Example 2 is otherwise followed. After the compressed bars are formed, they are treated by passing carbon dioxide gas through them at a pressure of 15 lbs. per square inch for 5 seconds.

EXAMPLE 4

The following mixture is prepared using the method of Example 2:

| | | |
|---|---|---|
| 1. | PFF 10 perlite (powder) | 168 g (40%) |
| 2. | Sodium fluosilicate (powder) | 12.5 g (3%) |
| 3. | Water | 12.5 g (3%) |
| 4. | Zinc oxide | 25 g (6%) |
| 5. | Sodium silicate solution | 202 g (48%) |

EXAMPLE 5

The following mixture is prepared using the method of Example 2:

| | | |
|---|---|---|
| 1. | PFF 10 perlite (powder) | 151 g (36%) |
| 2. | Sodium fluosilicate (powder) | 14.5 g (3.5%) |
| 3. | Water | 89.5 g (21.5%) |
| 4. | Zinc oxide | 33 g (8%) |
| 5. | Sodium silicate | 130 g (31%) |

EXAMPLE 6

The following mixture is prepared using the method of Example 2:

| | | |
|---|---|---|
| 1. | PFF 10 perlite (powder) | 168 g (40%) |
| 2. | Sodium fluosilicate (powder) | 12.5 g (3%) |
| 3. | Water | 12.5 g (3%) |
| 4. | Zinc oxide | 25 g (6%) |
| 5. | Potassium silicate | 202 g (48%)) |

EXAMPLE 7

The following mixture is prepared using the method of Example 2:

| | | |
|---|---|---|
| 1. | PFF 10 perlite (powder) | 151 g (36%) |
| 2. | Sodium fluosilicate (powder) | 14.5 g (3.5%) |
| 3. | Water | 89.5 g (21.5%) |
| 4. | Zinc oxide | 33 g (8%) |
| 5. | Potassium silicate | 130 g (31%) |

EXAMPLE 8

The procedure of Example 2 is utilized with the mixture of Example 6 except the sodium fluosilicate is eliminated.

The material of each example is particularly resistant to boiling water. For example, the material of Example 2 retained its exact shape when subjected to boiling water for 5 hours and only suffered a weight loss of 10.0%. Similarly, the material of Example 3, when subjected to 5 hours of boiling water retained its exact shape and only suffered a weight loss of 11.5%. In contrast, the samples similar to Example 2 but without the sodium fluosilicate or the carbon dioxide of Examples 3 and 8 completely lost their shape and disintegrated into fine particles within 5 minutes of the time it was introduced into boiling water. In the absence of zinc oxide in Example 2, the material completely disintegrated within 30 minutes after being introduced into the boiling water.

The properties of the material made in accordance with this invention make the material particularly well suited for use as a high temperature insulation.

When the material was tested for bulk density in accordance with ASTM standard test C-303, it was found that the material had a bulk density ranging from 13.0 to 14.0 lbs. per cubic foot, more than satisfying the ASTM requirement of 13.5 through 14.0 lbs. per cubic foot.

The material of Example 2, when tested in accordance with ASTM standard test C-356 demonstrated a percent linear change of less than 1% at 1200° F. and a percent weight loss of less than 4% of 1200° F. as contrasted with the standard of less than 2% linear change and less than 5% weight loss at 1200° F.

The flexural strength of the material made in accordance with this invention and tested pursuant to ASTM standard test C-610 produced a flexural strength in excess of 45 lbs. per sq. inch for bulk densities of less than 13.5 lbs. per cubic foot. The flexural strength of bars made in accordance with Examples 4 and 5 is 66 and 55 lbs. per square inch respectively.

The material also passed the ASTM standard test C-421 for mechanical stability, test C-165 for compressive strength, test C-411 for hot surface performance and test E-84 for surface burn characteristics. The ASTM standard test C-692 for chlorine corrosion and the DANA stress corrosion test on stainless steel per military specification I-24-244 were also passed.

Reference will now be made to FIG. 1 for an illustration of the thermal insulating properties of the material. The curve as shown in FIG. 1 represents the results of ASTM standard test C-177 which measures the thermal conductivity K in Btu's per inch thickness per square foot per degree F. per hour. As shown in FIG. 1, the K factor is found on the ordinant and the temperature is found on the abscissa. It will be observed that a K factor of the material of this invention is substantially lower or better than the K factor of the ASTM standard. For example, the K factor of the material of this invention is 0.42 at 300° as compared with the ASTM test standard of less than 0.50. The K factor at 500° F. for the material of this invention is less than 0.53 and typically 0.44 whereas the ASTM standard is less than 0.60. At 700° F., thd ASTM standard is less than 0.71 whereas the material of this invention has a K factor of less than 0.65 and typically 0.55. At 900° F., the K factor of this invention is less than 0.78 and typically less than 0.72.

The ASTM tests referred to in the foregoing are described in detail in the ASTM 1975 Annual Standards Part 18 which is incorporated herein by reference.

The material has a cosmetically pleasing appearance due in large measure to the smoothness of the material. In this regard, the surface which is smoother than SIS-3 on official alloy Casting Institute Surface Indicator Scale and preferably as smooth as or smoother than SIS-2 on that scale.

The material will provide solid rigid shapes suitable for enclosing and insulating hot pipes, furnace outer walls, oven walls, cold pipe and walls, and fittings and valves.

The ability of the material to hold solid rigid shape and the smoothness of the material allows the material to be formed for making a tongue and groove or miterd joints such as that shown in FIGS. 2-5. As shown in these Figures, the tongues 10(a-d) and the grooves 12(a-d) in surfaces 14 may take on various shapes, some of which are fairly intricate. However, due to the ability of the material to hold its shape and the relative smoothness of the surfaces, appropriate mating of the tongues and grooves is assured.

Figure 2:
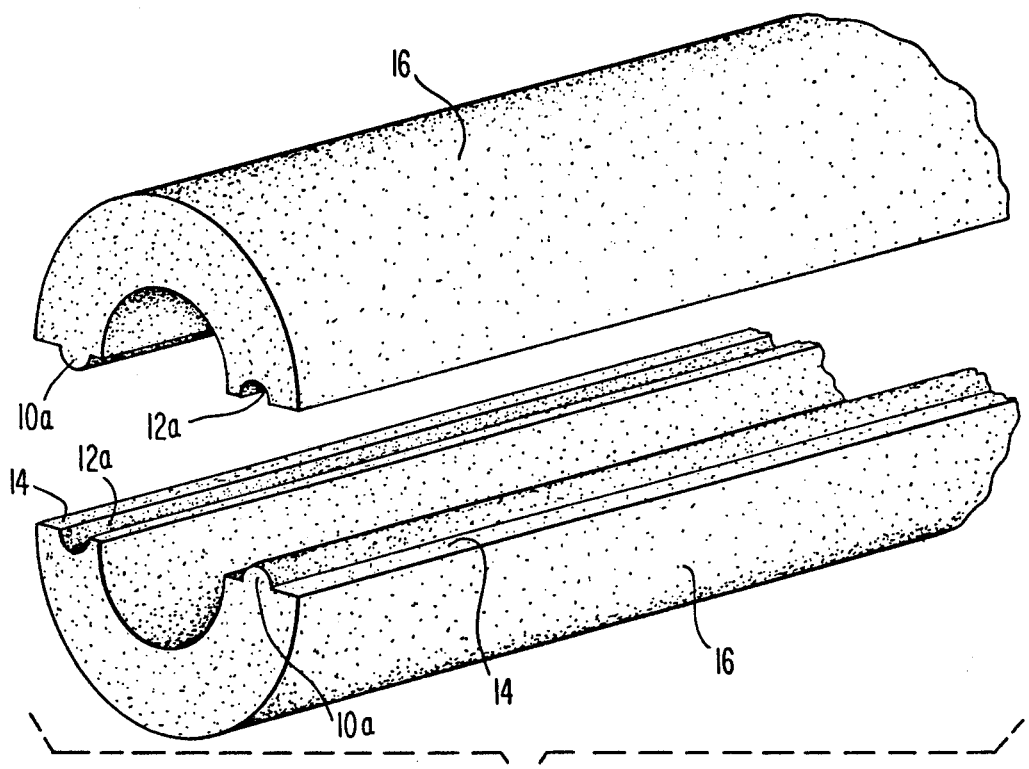
FIG. 2 is an exploded perspective view of the material of this invention formed into hollow tubular configuration.
Figure 3:
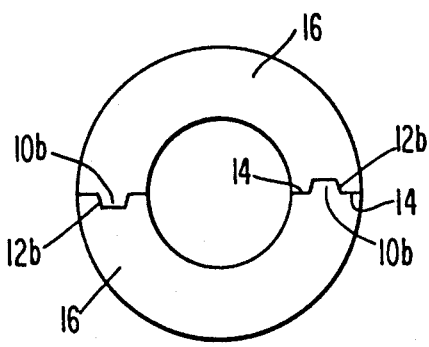
FIG. 3 is a sectional view of the tongue and grooving in another embodiment of the invention.
Figure 4:
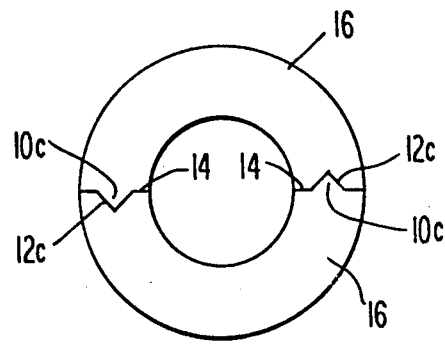
FIG. 4 is another sectional view of the tongue and grooving in yet another embodiment of the invention.
Figure 5:
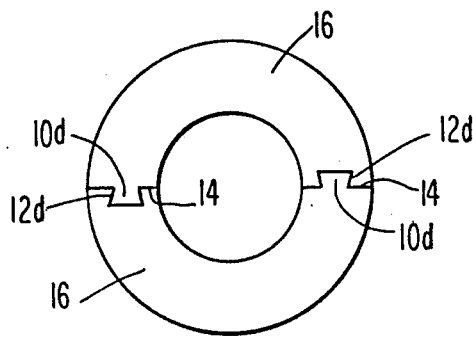
FIG. 5 is a sectional view of a tongue and grooving of still another embodiment of the invention.

As shown in FIGS. 2(a-c), the material comprises a hollow tubular configuration having a plurality of two or more segments 16 which include the tongues and grooves 10(a-d) and 12(a-d) in the surface 14 which extend parallel to the axis of the tubular configuration. However, it will be appreciated that the tongues and grooves may be utilized in planar sheets and other configurations such as might be required to accommodate the configurations of furnaces, fittings, valves and oven walls, etc. It will be noted that the dove-tail tongues and grooves of FIG. 5 permit the two segments to be joined without benefit of straps.

As already largely indicated, the material of the invention forms heat insulation of special strength and good heat resistance and water resistivity, made in a very practical, economical way.

It is thought that the particular components of the present invention work together in a very special way to give a high quality product. For example, it is believed that the sodium silicate, water and zinc oxide when dealt with in the way indicated herein as part of the present overall material react together to form willemite in large part, which is a complex material which is mainly a form of zinc silicate ($Zn_2SiO_4$) plus some basic zinc silicate plus some zinc sodium silicate ($Zn_2Na_2SiO_4H_2O$) and willimite is believed to contribute greatly to the strength and water resistivity of the material. It is also believed that potassium silicate, water and zinc oxide will react to produce an analogous complex material.

The sodium fluosilicate as applied in this particular setting is believed to help secure dimensional stability while the material is undergoing dehydration, and also help prevent disintegration of the other components as a result of the presence of water. The fiber material is believed to help increase the final strength and also reduce any tendency toward fracture of the structure by impact.

In view of our invention and disclosure, variations and modifications to meet individual whim or particular need will doubtless become evident to others skilled in the art to obtain all or part of the benefits of our invention without copying the process and product shown, and we, therefore, claim all such insofar as they fall within the reasonable spirit and scope of our claims.

What is claimed is:

1. A process of making a coherent rigid solid material comprising the steps of mixing materials in the following parts by weight:
   expanded perlite 20 through 50 parts;
   sodium silicate or potassium silicate including 9.5 through 19 parts solids content of sodium silicate itself;
   zinc oxide 2 through 9 parts;
   sodium fluosilicate 1 through 6 parts; and
   water, to make a total of water, including any that may be associated with the sodium silicate or the potassium silicate of 21.5 through 67 parts, and
thereafter subjecting the mixture to heat as a result of which there is no longer the original content of water.

2. The process of claim 1 including the step of compressing the mixture into shape between mixing and heating.

3. The process of claim 2 in which the compressing is done by vibration.

4. The process of claim 2 in which the compressing is done in a plurality of compression steps wherein only part of the mixture is compressed in each of said compression steps.

5. The process of claim 1 in which a dry material including at least the expanded perlite, and a slurry including the sodium or potassium silicate, zinc oxide, sodium fluosilicate and water, are brought together and mixed at least until the mixture appears damp and dust free but short of the time the mixture starts to shrink substantially.

6. The process of claim 1 in which after the mixing the mixture is held in storage from 1 hour through 2½ hours and then compressed into shape before subjecting to heat.

7. The process of claim 1 in which the subjecting to heat is done in the temperature range from 93° C. through 99° C.

8. The process of claim 1 in which the subjecting to heat is done in a hot air oven at approximately 96° C. for approximately 4 hours for each inch of minimum dimension of the shape.

9. The process of claim 1 in which the mixture is subjected to heat generated by microwave energy.

10. The process of claim 1 including the step of blowing the material into shape between mixing and heating.

11. The process of claim 1 in which an organic or inorganic fiber material is mixed with said materials.

12. The process of claim 11 wherein the fiber material is from a class comprising 1 through 5 parts fiberglass, 0.2 through 1.5 parts heat resistant nylon, 1 through 5 parts mineral wool and 1 through 5 parts of netting, all by weight as a part of the mixture.

13. The process of claim 1 wherein said materials are mixed by the following parts by weight:
   expanded perlite 29 through 45 parts;
   sodium silicate 11.5 through 18 parts;
   zinc oxide 3 through 8 parts; and
   water, to make a total of water including any that may be associated with the sodium silicate, of 26.5 through 57 parts.

14. The process of claim 1 wherein said materials are mixed by the following parts by weight:
   expanded perlite 36 through 42 parts;
   sodium silicate 14.5 through 16.5 parts;
   zinc oxide 4.5 through 6.8 parts; and
   water, to make a total of water, including any that may be associated with the sodium silicate, of 32.5 through 43.5 parts.

15. A process of making a coherent rigid solid material comprising the steps of mixing materials comprising the following parts by weight:
   expanded perlite 20 through 50 parts;
   sodium silicate or potassium silicate including 9.5 through 19 parts solids content of sodium silicate itself;
   zinc oxide 3 through 8 parts; and
   water, to make a total of water, including any that may be associated with the sodium silicate or potassium silicate of 21.5 through 67 parts; and
thereafter subjecting the mixture to heat as a result of which there is no longer the original content of water.

16. The process of claim 5 including the step of compressing the mixture into shape between mixing and subjecting to heat.

17. The process of claim 16 wherein the mixture is compressed into a shape comprising separable segments with mating tongues and grooves.

18. The process of claim 15 including the step of blowing the mixture into shape between mixing and subjecting to heat.

19. The process of claim 18 wherein the mixture is blown into a shape comprising separate segments with mating tongues and grooves.

20. A process of making a coherent rigid solid material comprising the following steps:
 1. mixing together into a mixture materials having the following parts by weight:
    expanded perlite 20 through 50 parts;
    sodium silicate or potassium silicate including 9.5 through 19 parts solids content of sodium or potassium silicate itself;
    zinc oxide 2 through 9 parts;
    sodium fluosilicate 1 through 6 parts; and
    water, to make a total of water, including any that may be associated with the sodium silicate or the potassium silicate of 21.5 through 67 parts;
 2. blow molding the mixture to a desired shape; and
 3. curing the mixture in the blow molded shape by heating.

21. The process of claim 20 including the step of solidifying the mixture after blow molding and before curing by exposing the mixture to carbon dioxide gas under pressure.

22. The process of claim 21 wherein the carbon dioxide is under a gauge pressure of 15 pounds per inch of thickness of the molded shape.

23. The process of claim 20 wherein the blow molding forms a tongue in the shape.

24. The process of claim 20 wherein the blow molding forms a groove in the shape.

25. The process of claim 20 wherein the blow molding forms a tongue and a groove in the shape.

26. The process of claim 20 wherein the step of curing by heating comprises microwave heating the blow molded shape.

* * * * *